US009811301B2

(12) United States Patent
Choi et al.

(10) Patent No.: US 9,811,301 B2
(45) Date of Patent: Nov. 7, 2017

(54) TERMINAL AND APPARATUS AND METHOD FOR REDUCING DISPLAY LAG

(71) Applicant: SAMSUNG DISPLAY CO., LTD., Yongin, Gyeonggi-Do (KR)

(72) Inventors: Nam-Gon Choi, Yongin-si (KR); Gi Geun Kim, Seoul (KR); Hong Soo Kim, Hwaseong-si (KR); Geun Jeong Park, Daegu (KR); Ho Seok Son, Anyang-si (KR); Dong Gyu Lee, Seoul (KR); Dong-Won Park, Hwaseong-si (KR); Cheol Woo Park, Suwon-si (KR); Yun Ki Baek, Suwon-si (KR); Bong Hyun You, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 331 days.

(21) Appl. No.: 14/628,172

(22) Filed: Feb. 20, 2015

(65) Prior Publication Data

US 2016/0077782 A1 Mar. 17, 2016

(30) Foreign Application Priority Data

Sep. 15, 2014 (KR) .................... 10-2014-0121977

(51) Int. Cl.
*G06F 3/14* (2006.01)
*G06F 3/041* (2006.01)
*G06T 11/60* (2006.01)

(52) U.S. Cl.
CPC .......... *G06F 3/1407* (2013.01); *G06F 3/0416* (2013.01); *G06T 11/60* (2013.01)

(58) Field of Classification Search
CPC ...... G06F 3/0416; G06F 3/1407; G06F 3/041; G06F 3/0488; G06T 11/60
See application file for complete search history.

(56) References Cited

U.S. PATENT DOCUMENTS 9,017,164 B2 * 4/2015 Sakai .................... G06F 1/1626
463/31
2010/0079394 A1 4/2010 Tanaka et al.
(Continued)

FOREIGN PATENT DOCUMENTS

KR  10-2005-0029511 A   3/2005
KR  10-2010-0122383 A   11/2010
KR  10-2012-0092037 A   8/2012

OTHER PUBLICATIONS

U.S. Office action dated Aug. 13, 2015, for cross reference U.S. Appl. No. 14/226,776, (26 pages).
(Continued)

*Primary Examiner* — Latanya Bibbins
(74) *Attorney, Agent, or Firm* — Lewis Roca Rothgerber Christie LLP

(57) ABSTRACT

An apparatus includes an overlay buffer configured to store overlay data; a touch path logic to: receive first touch events from the first touch sensor panel and generate a first output based on the first touch events, and receive second touch events from the second touch sensor panel and generate a second output based on the second touch events; and a rendering logic to, when the first touch events occur: receive a first video image; receive the first output; and combine the first video image with the overlay data corresponding to the first video image to output at least one combined display image, and, when the second touch events occur: receive a second video image; receive the second output; and combine the second video image with the overlay data corresponding to the second video image to output the at least one combined display image.

20 Claims, 12 Drawing Sheets

(56) References Cited

U.S. PATENT DOCUMENTS

| | | |
|---|---|---|
| 2010/0271313 A1 | 10/2010 | Low et al. |
| 2010/0277429 A1* | 11/2010 | Day .................... G06F 3/0416 345/173 |
| 2010/0277505 A1 | 11/2010 | Ludden et al. |
| 2011/0310118 A1 | 12/2011 | Asmi et al. |
| 2013/0201112 A1 | 8/2013 | Large et al. |
| 2014/0168096 A1 | 6/2014 | Bathiche et al. |
| 2014/0313144 A1 | 10/2014 | Seto et al. |

OTHER PUBLICATIONS

Extended European Search Report dated Oct. 2, 2014 for EP 14165516.7, 13 pages.

Gutwin, Carl et al., "Improving Interpretation of Remote Gestures with Telepointer Traces", Proceedings of the 2002 ACM Conference on Computer-Supported Cooperative Work, Nov. 16-20, 2002, 10 pages.

Ng, Albert et al., "Designing for Low-Latency Direct-Touch Input", Proceedings of the 2012 ACM Conference on User Interface Software and Technology, Oct. 7-10, 2012, pp. 453-464.

U.S. Notice of Allowance dated Mar. 2, 2016, for cross reference U.S. Appl. No. 14/226,776, (15 pages).

* cited by examiner

TERMINAL AND APPARATUS AND METHOD FOR REDUCING DISPLAY LAG

CROSS-REFERENCE TO RELATED APPLICATION

This application claims priority to and the benefit of Korean Patent Application No. 10-2014-0121977 filed in the Korean Intellectual Property Office on Sep. 15, 2014, the entire contents of which are incorporated herein by reference.

BACKGROUND

1. Field

Embodiments of the present invention relate to terminals with touch input devices, and more specifically, methods for reducing display lag between the touch input device and the display device.

2. Description of the Related Art

Display panels incorporating or coupled to touch sensor panels provide an interaction system for touch-enabled terminals such as mobile phones, tablet computers, laptop computers, and desktop computers. In such terminals, graphics are displayed on the display panel and a user can interact with these terminals by touching the screen (e.g., using an active stylus, a passive stylus, or a body part such as a finger), thereby providing an intuitive user interface.

Touch events detected by the touch sensor panels are typically processed by high level application software running on an application processor (AP) of the device. The many processing steps between the touch sensor panel and the AP and the non-deterministic processing time on the AP (including delays due to other computational tasks being performed by the AP) introduce high levels of latency (e.g., 70 to 100 milliseconds) that reduce responsiveness of the computing device to the user's touch inputs.

Some empirical studies have indicated that most humans can detect even a 30 millisecond asynchrony between senses, such as touch and vision. Delays of 50 to 200 milliseconds would be detectable to most of users of these computing devices, which can lead to increased user frustration due to the failure of computing of the device to immediately provide feedback to the user's input.

Recently, mobile phones having both a front touch sensor panel installed on a front face and a rear touch sensor panel installed on a rear face have been provided. In this case, the user frustration can be further increased due to the delays occurring on both the front touch sensor panel and the rear touch sensor panel.

SUMMARY

Embodiments of the present invention reduce display lag according to touches in a terminal having a plurality of touch sensor panels.

According to one embodiment of the present invention, an apparatus for reducing display lag of a terminal including at least one display panel and first and second touch sensor panels corresponding to the at least one display panel is provided. The apparatus includes at least one overlay buffer, at least one touch path logic, and at least one rendering logic. The overlay buffer stores at least one overlay data. The touch path logic receives first touch events from the first touch sensor panel and generates a first output based on the first touch events, and receives second touch events from the second touch sensor panel and generates a second output based on the second touch events. When the first touch events occur, the rendering logic receives a first video image, receives the first output of the touch path logic, and combines the first video image with the overlay data corresponding to the first video image to output at least one combined display image. When the second touch events occur, the rendering logic receives a second video image, receives the second output of the touch path logic, and combines the second video image with the overlay data corresponding to the second video image to output the at least one combined display image.

The first video image or the second video image may include a line displayed on the display panel. A characteristic of the overlay data may match a characteristic of the line.

The characteristic may include a color.

The at least one touch path logic may generate mask data in accordance with the first touch events or the second touch events. The mask data may include a matrix of numerical values, each of the numerical values identifying an operation of the at least one rendering logic to produce the at least one combined display image. Positions of the numerical values within the matrix may correspond to positions of pixels in the at least one combined display image.

The at least one rendering logic may combine the first or second video image with the overlay data by determining, for each pixel in the at least one combined display image, whether to output the first or second video image of a corresponding pixel or the overlay data in accordance with a numerical value in a corresponding position of the mask data.

The at least one rendering logic may combine the first or second video image with the overlay data by determining, for each pixel in the at least one combined display image, how to blend the first or second video image of a corresponding pixel and the overlay data in accordance with a numerical value in a corresponding position in the mask data.

The overlay data may include a plurality of pages. The mask data may include information identifying at least one of the plurality of pages.

The at least one touch path logic may receive a parameter, to compute an estimated touch path in accordance with the first or second touch events, and may generate the mask data in accordance with the estimated touch path and the parameter. The parameter may control a region wherein the estimated touch path is allowed, or control a width, a style, or a shape of the estimated touch path.

The display panel may include a first display panel corresponding to the first touch sensor panel and a second display panel corresponding to the second touch sensor panel. The touch path logic may include a first touch path logic configured to generate the first output based on the first touch events and a second touch path logic configured to generate the second output based on the second touch events. The rendering logic may include a first rendering logic configured to combine the first video image with the overlay data corresponding to the first video image and a second rendering logic configured to combine the second video image with the overlay data corresponding to the second video image.

The first touch sensor panel may correspond to a front face of the display panel, and the second touch sensor panel may correspond to a rear face of the display panel.

The overlay buffer may receive and store the overlay data during a blank time of a horizontal period or a blank time of a vertical period in a frame.

The overlay buffer may receive and store the overlay data together with the first or second video image in a frame.

According to another embodiment of the present invention, a terminal including an application processor, at least one display panel, and first and second touch sensor panels corresponding to the display panel is provided. The processor receives a video frame for the display panel from the application processor. Further, when first touch events occur on the first touch sensor panel, the processor determines a first touch path based on the first touch events and updates the video frame based on the first touch path and stored first overlay data. When second touch events occur on the second touch sensor panel, the processor determines a second touch path based on the second touch events and updates the video frame based on the second touch path and stored second overlay data.

The video frame may include a line displayed on the display panel. A characteristic of the first or second overlay data may match a characteristic of the line.

The processor may generate mask data in accordance with the first or second touch events. The mask data may include a matrix of numerical values, positions of the numerical values corresponding to positions of pixels in the video frame. The processor may update the video frame by determining, for each pixel in the video frame, whether to output a corresponding pixel data of the video frame or the first or second overlay data in accordance with a numerical value in a corresponding position of the mask data.

Alternatively, the processor may update the video frame by determining, for each pixel in the video frame, how to blend a corresponding pixel data of the video frame and the first or second overlay data in accordance with a numerical value in a corresponding position of the mask data.

The processor may receive a parameter from the application processor, and to update the video frame based on the first or second touch path, the first or second overlay data, and the parameter. The parameter may control a region wherein the first or second touch path is allowed, or control a width, a style, or a shape of the first or second touch path.

The display panel may include a first display panel corresponding to the first touch sensor panel and a second display panel corresponding to the second touch sensor panel. The processor may include a first processor configured to update the video frame based on the first touch path and the first overlay data, and a second processor configured to update the video frame based on the second touch path and the second overlay data.

The first touch sensor panel may correspond to a front face of the display panel, and the second touch sensor panel corresponds to a rear face of the display panel.

According to yet another embodiment of the present invention, a method of reducing display lag according to a touch input is provided by a terminal. The method includes receiving first touch events from a first touch sensor panel, receiving a first video image, combining the first video image with first overlay data in accordance with the first touch events, and displaying at least one combined display image of the first video image and the first overlay data. The method further includes receiving second touch events from a second touch sensor panel, receiving a second video image, combining the second video image with second overlay data in accordance with the second touch events, and displaying the at least one combined display image of the second video image and the second overlay data.

DETAILED DESCRIPTION

Figure 1A:
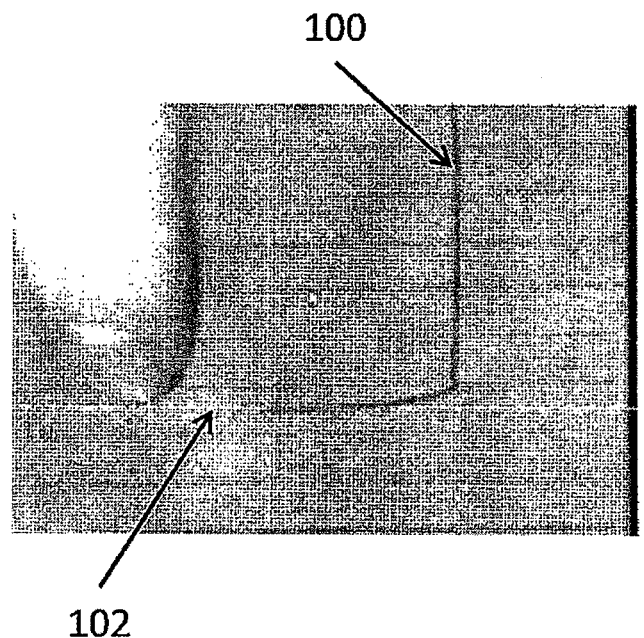
FIG. 1A illustrates a response of a terminal including a comparable touch input processing device.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Embodiments of the present invention allow a user to perceive a faster touch response by displaying an image based on touch locations in advance of the application processor (AP) rendered image.

A common complaint of mobile phone users is the lag of the user interface (UI). Current mobile phones typically take 50 to 200 milliseconds to update the display in response to a touch action. For example, the typical display response time to a touch event as measured on a Samsung® Galaxy Note® 2 phone may be more than 100 milliseconds or roughly more than 6 frames of video images, based on a refresh rate of 60 frames per second (FPS), which is noticeable to a large portion of users.

FIG. 1A illustrates the response of a terminal including a comparable touch input processing device. As shown in FIG. 1A, when a finger moves while touching a screen, a displayed line 100 has a gap 102 between the position of the finger and the last drawn portion of the displayed line 100, thereby causing a noticeable display lag between the user's touch and the displayed line. A similar display lag is also typically encountered when using a stylus, whether active or passive.

Embodiments of the present invention allow the user to perceive a faster touch response by overlaying an image in the touch path in advance of the AP rendered image. By closing the gap between the user's touch point (whether using a finger, a stylus, or other implement) and the drawing of the line on the screen, the perceived display lag can be decreased. As used herein, the term "overlay" when used as a verb refers to combining video images (e.g., an AP rendered image) and additional image data such that the additional image data replaces (or "overlays") some portion of the original video images. The term "overlay" when used as a noun may also refer to the appearance of that additional image data in the combined display image.

In addition, by using an overlay method, application software can also control the region (e.g., the location on the display), color, and rendering operation of the displayed response to a touch event.

Figure 1B:
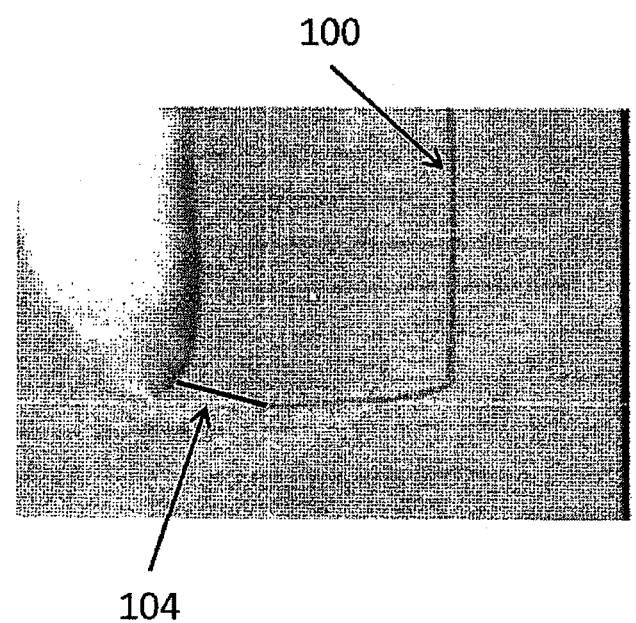
FIG. 1B illustrates a response of a terminal including a touch input processing device according to embodiments of the present invention

FIG. 1B illustrates the displayed response of a terminal including a touch input processing device according to embodiments of the present invention, where the displayed line includes an estimated or computed portion 104 that is drawn by a low latency overlay system according to embodiments of the present invention, thereby reducing the display lag perceived by the user.

Figure 2:
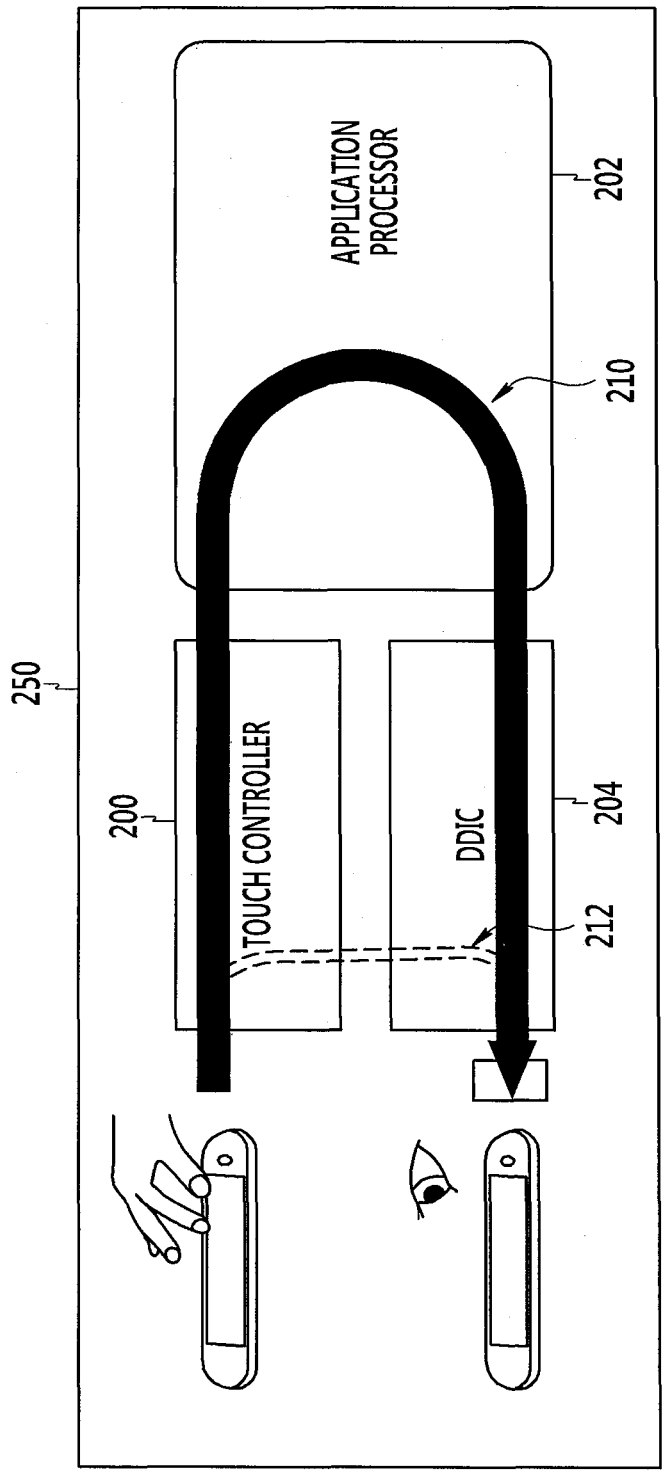
FIG. 2 illustrates a conventional feedback path and a low latency feedback path according to embodiments of the present invention.

Referring to FIG. 2, in a terminal 250 such as a mobile phone, embodiments of the present invention provide visual feedback immediately or more quickly over a low latency path 212 through a touch controller 200 and a display driver interface controller (DDIC) 204, followed by visual images at conventional levels of latency over a conventional latency path 210 through an AP 202.

Figure 3:
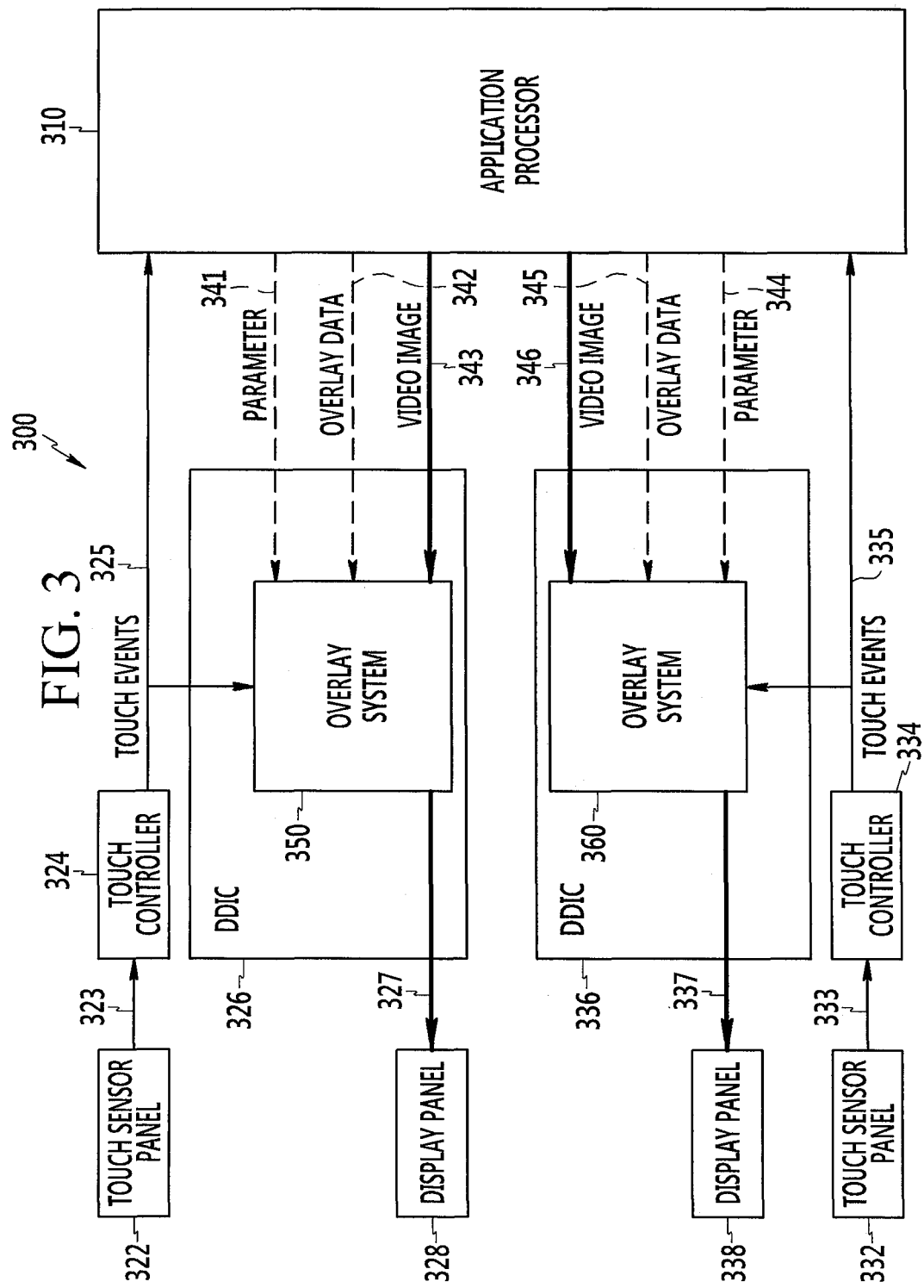
FIG. 3 is a block diagram illustrating a terminal according to an embodiment of the present invention.

Referring to FIG. 3, a terminal 300 according to an embodiment of the present invention includes an AP 310, a first touch screen display device, and a second touch screen display device. The first touch screen display device includes a first touch sensor panel 322, a first touch controller 324, a first DDIC 326, and a first display panel 328. The second touch screen display device includes a second touch sensor panel 332, a second touch controller 334, a second DDIC 336, and a second display panel 338. The first touch sensor panel 322 and the first display panel 328 may be provided on a front face of the terminal 300, and the second touch sensor panel 332 and the second display panel 338 may be provided on a rear face of the terminal 300.

When a touch occurs on the first touch sensor panel 322, the first touch controller 324 processes touch signals 323 from the first touch sensor panel 322 and outputs touch events 325, such as coordinates, to the AP 310 and the first DDIC 326. Similarly, when a touch occurs on the second touch sensor panel 332, the second touch controller 334 processes touch signals 333 from the second touch sensor panel 332 and outputs touch events 335 to the AP 310 and the second DDIC 336

Referring to FIG. 3, the touch sensor panel 322 or 332 detects a user's touches and generates the touch signals 323 or 333 which are supplied to the touch controller 324 or 334 over a data bus. Embodiments of the invention can be used with a touch sensor panel 322 or 332 that detects a user's touch using any type of pointing implement, such as a body part (e.g., a finger), a stylus, etc. As used herein, the term "pointing implement" refers to objects that can be detected by a touch sensor panel 322 or 332 including devices (such as an active stylus and a passive stylus) and body parts (such as a finger or a hand). Embodiments of the present invention can be used with any of a variety of types of touch input panels such as resistive touch panels, surface acoustic wave touch panels, capacitive touch panels, infrared touch panels, and optical touch panels. In one embodiment, touch signals 323 or 333 correspond to raw data supplied by the touch sensor panel 322 or 332, such as measurements of capacitance, voltage, or current for each location in the touch sensor panel. The data bus for the touch events 325 is connected to both the AP 310 and the DDIC 326, and the data bus for the touch events 335 is connected to both the AP 310 and the DDIC 336. The touch events 325 or 335 may be a stream of data values corresponding to locations at which touches by a user are detected (e.g., changes of capacitance, voltage, or current of a sufficiently high value to constitute the detection of a touch event). In some embodiments, the touch events 325 or 335 include pressure data indicating the pressure that is applied to the touch sensor panel.

The AP 310 processes the touch events 325 or 335, and application software running from the AP 310 performs the display composition accordingly, by rendering video images 343 (or frames) to the first DDIC 326 for displaying on the first display panel 328 and rendering video images 346 (or frames of video images) to the second DDIC 336 for displaying on the first display panel 328. The AP 310 may include a central processing unit (CPU), a graphical processing unit (GPU), and a memory.

The AP 310 is connected to the DDICs 326 and 336 which are connected to the display panels 328 and 338, respectively. The first DDIC 326 receives the video images 343 from the AP 310 and supplies pixel driving signals 327 to the first display panel 328, and the second DDIC 336 receives the video images 346 from the AP 310 and supplies pixel driving signals 337 to the second display panel 338.

In one embodiment, the DDIC 326 or 336 may be a timing controller for the display panel 328 or 338. The DDIC 326 or 336 may include an overlay system 350 or 360 for the overlay control. In one embodiment, the overlay system 350 or 360 may be a processor embedded in the timing controller, for example an advanced RISC machines (ARM) processor.

In one embodiment, the touch sensor panel 322 or 332, the touch controller 324 or 334, the DDIC 326 or 336, and the display panel 328 or 338 are all components of a display module, which may be separate from the AP 310. In another embodiment, the touch sensor panel 322 or 332, the touch controller 324 or 334, the DDIC 326 or 336, and the display panel 328 or 338, or combinations thereof, may reside in separate modules, or be combined with the AP 310.

The first DDIC 326 processes the video image data 343 received from the AP 310, and outputs the pixel driving signals 327 to the first display panel 328. The second DDIC 336 processes the video image data 346 received from the AP 310, and outputs the pixel driving signals 337 to the first display panel 338. The first DDIC 326 may further receive a parameter 341 and overlay data 342 from the AP 310 for the overlay processing according to the touches on the first touch sensor panel 322. The second DDIC 336 may further receive a parameter 344 and overlay data 345 from the AP 310 for the overlay processing according to the touches on the second touch sensor panel 332. The functions of the parameter 341 or 342 and the overlay data 342 or 345 will be described in more detail below.

According to embodiments of the present invention, the overlay systems 350 and 360 respectively process touch events 325 and 335 with the video images 343 and 346 so that the display panels 328 and 338 can show the visual responses to the touch events faster than in comparable implementations. In contrast to the approximately 6 frames or more display lag in some comparable devices, embodiments of the present invention can reduce the lag to 1 to 2 frames.

Figure 4:
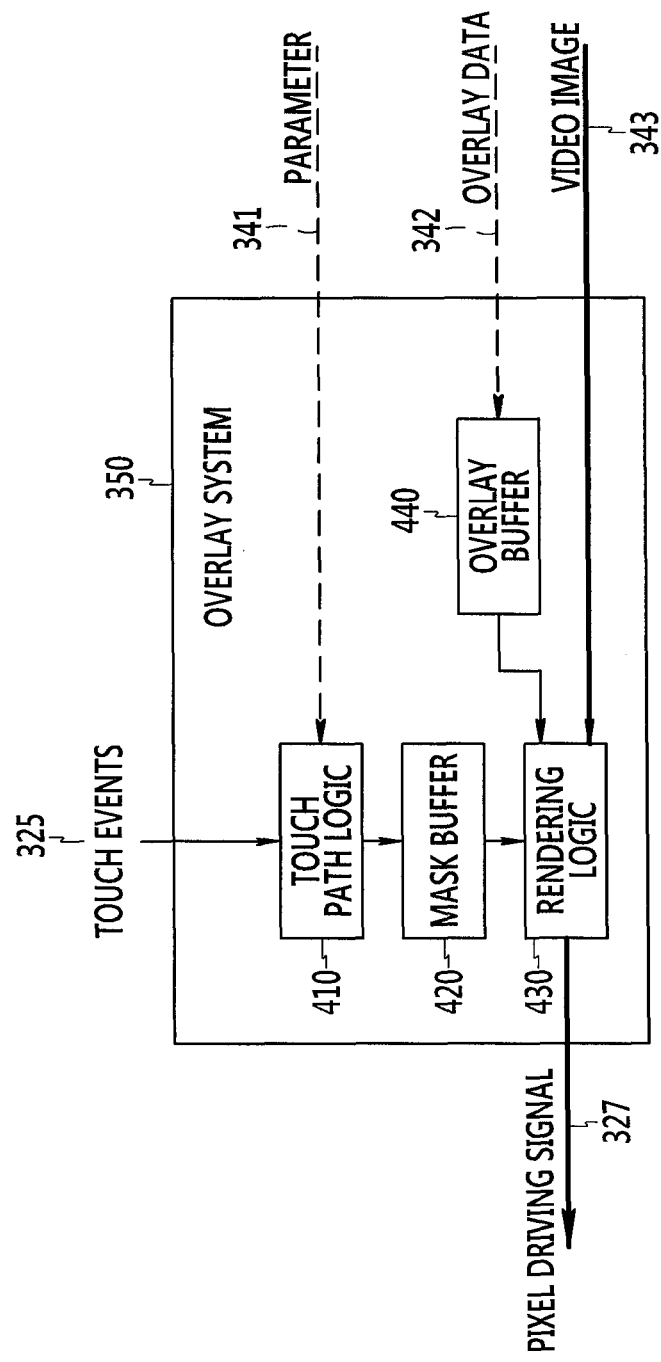
FIG. 4 is a block diagram illustrating an overlay system according to one embodiment of the present invention.

FIG. 4 is a block diagram illustrating an overlay system 350 according to an embodiment of the present invention. While one example of an overlay system 350 for a first touch screen display device shown in FIG. 3 is illustrated in FIG. 4, an overlay system 360 for a second touch screen display device may be implemented in a manner substantially similar to the overlay system 350 shown in FIG. 4.

Referring to FIG. 4, an overlay system 350 according to an embodiment of the present invention includes a touch path logic 410, a mask buffer 420, a rendering logic 430, and an overlay buffer 440. The overlay system 350 may be embedded in a DDIC (326 of FIG. 3), or portions of the overlay system 350 may be included in a DDIC 326 or an AP (310 of FIG. 3), and other portions may be included in a touch controller (324 of FIG. 3).

In one embodiment, the touch path logic 410 is connected to the touch controller 324 and receives touch events 325 from the touch controller 324. The touch path logic 410 may also be connected to the AP 310 to receive configuration parameters 341. The touch path logic 410 is also connected to mask buffer 420, which is used by the rendering logic 430.

According to one embodiment, the overlay buffer 440 is a memory device within the DDIC 326 that is connected to the AP 310 and that stores overlay data 342 received from the AP 310. The overlay buffer 440 supplies the stored overlay data 342 to the rendering logic 430. However, embodiments of the present invention are not limited thereto. For example, in one embodiment, the overlay data 342 may be created internal to the overlay system 310 without inputs from the AP 310. In yet another embodiment, the overlay data 342 may be a combination of data created internal to the overlay system 310 and data corresponding to the inputs from the AP 310.

According to one embodiment, the rendering logic 430 is coupled to the AP 310 and the overlay buffer 440 and combines the overlay data 342 with the video images 343 in accordance with the values in mask data 500. The output of the rendering logic 430 is connected to the display panel 328 to supply the combined display images of the overlay data 342 and the video images 343 to the display panel 328 as pixel driving signals 327.

However, embodiments of the present invention are not limited thereto.

For example, in one embodiment, the touch path logic 410, mask buffer 420, rendering logic 430, and overlay buffer 440 are each implemented using different application specific integrated circuits (ASICs). In other embodiments of the present invention, a single ASIC is used to implement all functions. In still other embodiments of the present invention, a field programmable gate array (FPGA) is programmed to perform the functions of each of the touch path logic 410, the mask buffer 420, the rendering logic 430, and the overlay buffer 440. Alternatively, a general purpose processor may be programmed (e.g., with instructions stored in a memory connected to a general purpose processor) to perform the functions of each of the touch path logic 410, the mask buffer 420, the rendering logic 430, and the overlay buffer 440. In still other embodiments, the functionality of one or more of the touch path logic 410, the mask buffer 420, the rendering logic 430, and the overlay buffer 440 are implemented as components of the AP 310.

Furthermore, although the touch path logic 410, the mask buffer 420, the rendering logic 430, and the overlay buffer 440 are shown in FIG. 4 as being components of the DDIC 326, embodiments of the present invention are not limited thereto. In some embodiments, one or more of the touch path logic 410, the mask buffer 420, the rendering logic 430, and the overlay buffer 440 (or components capable of performing these functions) are located within, for example, the touch controller 324 or the AP 310, or as a separate component. In addition, the components or the functions they perform may be located in different portions of the device. For example, the touch path logic 410 may be implemented as a component or a function of the touch controller 324, and both the overlay buffer 440 and the rendering logic 430 may be implemented as a component (or components) or a function (or functions) of the AP 310.

In addition, although the touch controller 324 is illustrated as a physically separate component in FIG. 3, in some embodiments the touch controller 324 is a portion of a larger integrated circuit. For example, the touch controller may be implemented in an integrated circuit along with an AP and/or a DDIC.

Figure 5:
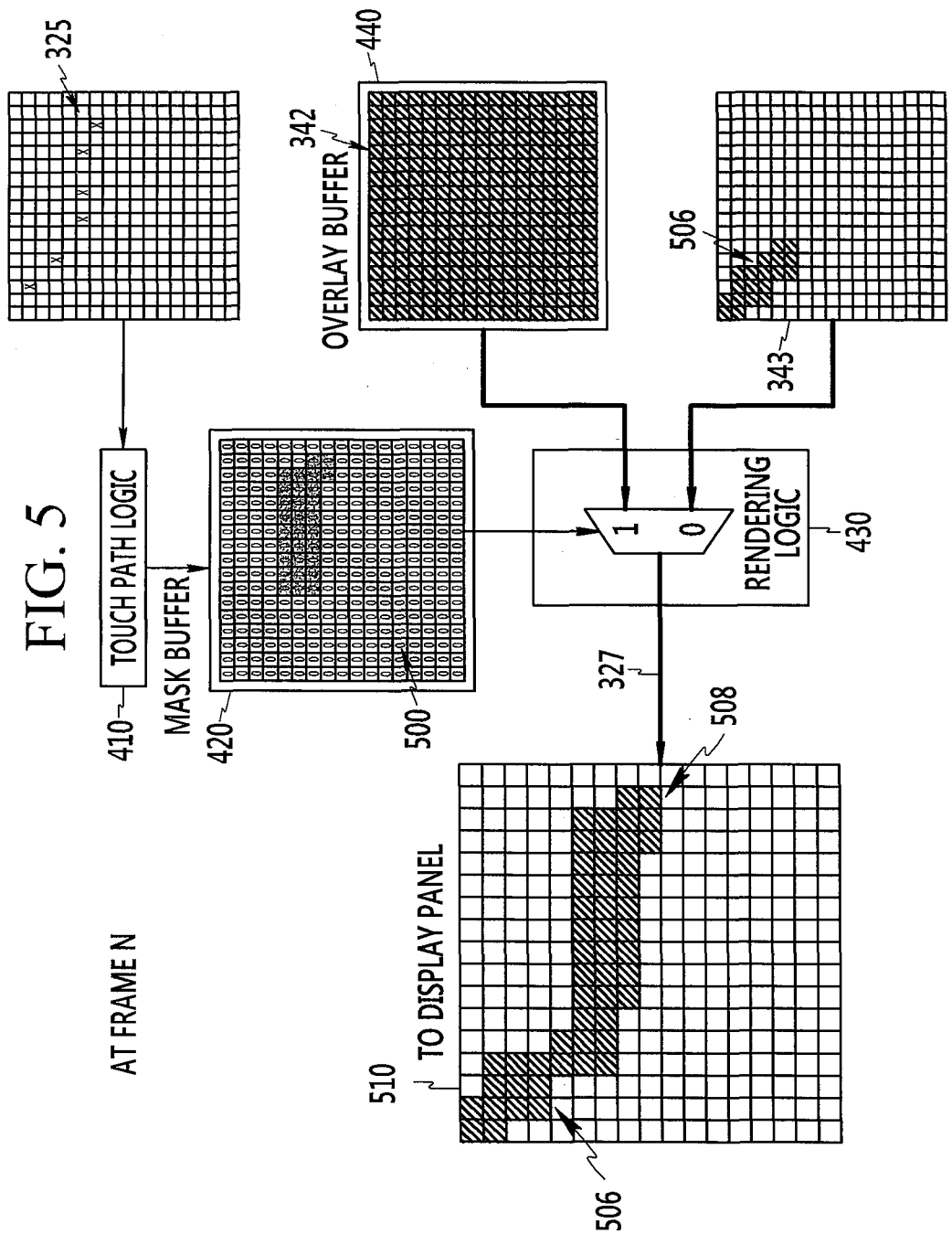
FIG. 5 and FIG. 6 illustrate generation of a combined display image according to an embodiment of the present invention.

FIG. 5 is a schematic illustration of the combination of video images 343 (or frames of video images), overlay data 342, and touch events 325 to generate a first set of combined display images 510 during an Nth frame (e.g., to generate Frame N), in accordance with an embodiment of the present invention.

Referring to FIG. 5, the touch path logic 410 processes the touch events 325 at a current frame N from the touch controller (324 of FIG. 3) and touch events received over previous consecutive frames (e.g., the past X frames), and generates an estimated touch path. For example, the touch path logic 410 may generate the estimated touch path by interpolating and/or extrapolating between the locations of the successive touch events over the consecutive frames. The estimated touch path is then applied by the touch path logic 410 to generate mask data 500, which are stored within the mask buffer 420. The rendering logic 430 combines the overlay data 342 stored in the overlay buffer 440 with the video image for the current frame N from the AP 310 in accordance with the mask data 500 to generate the combined display image 510.

According to one embodiment, the mask data 500 is a matrix of numerical values, wherein a position in the matrix corresponds to a position of a pixel (or pixels) in the display panel 328 and wherein the relative positions of the values in the matrix correspond to the relative positions of the pixels in the display panel 328 (e.g., the mask data 500 may be thought of as a two-dimensional matrix corresponding to a two-dimensional map of the pixel positions in the combined display image 510). According to one embodiment, each of the values of the mask data 500 is represented as a single bit, and the positions of the values in the mask data matrix correspond to positions in the combined display image. Positions where the overlay data are to be shown in the combined display image have the values set to a first value (e.g., "1") and positions where the overlay data are not to be shown (e.g., where the video image data is to be shown) have values set to a second, different value (e.g., "0").

According to other embodiments of the present invention, each of the numerical values in the mask data 500 is represented by multiple bits (e.g., 8 bits), where the numerical value of the mask data 500 refers to the "transparency" of the overlay data at each location in the display. As used herein, the term "transparency" denotes a blending (e.g., merging) of the overlay data 342 and the video image 343 such that the combined display image 510 takes on characteristics of both the overlay data 342 and the video image 343.

Use of the mask buffer 420 by the rendering logic 430 will be described in more detail below.

In one embodiment, for each video frame, the touch path logic 410 generates the estimated touch path based on a subset of the touch events corresponding to a fixed number of video frames.

In another embodiment, the number of video frames is configurable to be in line with the display lag from the AP 310.

In another embodiment, the touch path logic 410 generates a touch path for a variable number of video frames. The number of video frames can be determined from an external logic based on the past video images 343 from the AP 310.

In one embodiment, a set of parameters 341 governs the characteristics of the estimated touch path when the path is generated. The parameters can have a start-up default, but may be adjusted as needed during run-time by software or other means. These parameters include, but are not limited to: width of path generated; style of line segments generated, such as simple straight segments or curves; region of the display wherein the path is allowed (e.g., the active drawing area); and/or the style of the rendering operation (e.g., anti-aliasing operations, smoothing operations, and transparency).

For example, when embodiments of the present invention are used in the context of a software application for drawing (e.g., a digital sketchbook), an overlay image segment 508 (which may also be referred to as a computed portion), which is a portion of the combined display image 510, is only applied to portions of the display corresponding to the active drawing area. The overlay system 350 generally does not apply overlay data over portions of the display outside of the active drawing area. As such, parameters 341 can be set to restrict the estimated touch path to the portion of the display corresponding to the active drawing area. In another example, the parameters 341 can contain the line width of the drawn line. The touch path logic 410 will use this parameter along with the pressure data of the touch events 325 to render the shape of the line in the mask data 500 ahead of the AP-generated line (or image segment) 506 from the AP 310. (The image segment 506 may also be referred to as the displayed line.)

As each pixel of the video image 343 is processed by the rendering logic 430, the rendering logic 430 retrieves a value in the mask data 500 wherein the position of the value in the mask data (e.g., the position in a matrix) corresponds to the location of the pixel in the video image 343, and performs a substitution of the video image 343 for the pixel with the overlay data 342 or a blending of the video image 343 for the pixel and the overlay data 342 in accordance with the value in the mask data 500 to achieve desired visual effects (e.g., transparency and/or anti-aliasing), and outputs either the overlay data 342 or the video image 343, or a blend thereof, to the display panel 328 via the pixel driving signal 327.

For example, in the substitution embodiment of this invention, the rendering operation of the rendering logic 430 can be specified using a single bit as defined by the values in the mask data 500. The rendering operation selects the output of the rendering logic 430 to be either the video image 343 or the overlay data 342 for each pixel based on the value at the position in the mask data 500 corresponding to the position of the pixel in the combined display image 510.

In one embodiment of the present invention, the number of values of (or size of) the mask data 500 equals the number of pixels in one frame of the video images 343. Thus there is a one-to-one relationship between each value in the mask data 500 and each pixel of the video image 343. In other words, the substitution embodiment of the rendering logic 430 is performed by matching each value in the mask data 500 to a corresponding pixel in the video image 343 and outputting either the video image 343 for the pixel or the overlay data 342 to the display panel 328. For example, in one embodiment the rendering logic 430 iterates through each value of the mask data 500. If a value of 0 exists at a particular position in the mask data 500, then the rendering logic 430 outputs the video image 343 for the corresponding pixel. On the other hand, if a value of 1 exists at a particular position in the mask data 500, then the rendering logic 430 outputs the overlay data 342. As a result of the iterative process, the rendering logic 430 outputs a combined display image 510, as represented in the pixel driving signal 327, to the display panel 328.

In another embodiment of the present invention, the number of values in the mask data 500 may be less than the number of pixels in a frame of video images 343. Thus, each value in the mask data 500 may have a one-to-many relationship to the pixels of video images 343 such that a value in the mask data 500 corresponds to multiple pixels of a video image 343, thereby reducing the size of the mask data 500 and reducing the memory requirements of the mask buffer 420.

However, embodiments of the present invention are not limited thereto. In the substitution embodiment of the present invention, the rendering operation of the rendering logic 430 can be specified using multiple bits as defined by the values in the mask data 500. For example, the values in the mask data 500 may identify the level of blending (e.g., the level of transparency) to be rendered by the rendering logic 430. In another example, if multiple rendering operations are supported by the rendering logic 430, one or more bits of the values in the mask data 500 can be used to define the desired rendering operation, while other bits can be used to adjust the specifications of those rendering operations. The rendering logic 430 can perform various rendering operations between the information carried in the video image 343 and the information carried in the overlay data 342, such as edge-enhance, dodge (lighten), burn (darken), etc. In other embodiments, the rendering operation may change the color or luminosity of portions of the video image 343, thereby generating transparent coloring (or highlighting) effect or alpha compositing effect The rendering logic 430 receives two inputs, wherein the first input contains the video images 343 from the AP 310, and the second input contains the overlay data 342 from the overlay buffer 440. The overlay buffer 440 stores the overlay data 342 to be processed by the rendering logic 430. The overlay data 342 can be provided by the AP 310 or created internally in the overlay system 310, wherein the characteristics of the overlay data 342 are determined by the desired output of the rendering logic 430. In one embodiment, the characteristics (e.g., the appearance) of the overlay data 342 are matched to the characteristics (e.g., the appearance) of the video image 343 along the displayed line 100 such that when rendered according to the mask data 500, the combined display image 510 contains a seamless transition between the image segment 506 and the overlay image segment 508. These characteristics may include a color. For example, if the application software draws a black line, then the overlay data 342 would be provided by the AP 310 or internally created by the overlay system 350 to contain the same black color (e.g., a bitmapped image where all the pixels are black) as the software-drawn line. The rendering logic 430 would output a combined display image 510 that contains a black line formed by adjoining the image segment 506 (e.g., the software-drawn black line) from the AP 310 and the overlay image segment 508 as determined by the mask data 500 and the overlay data 342. The overlay data 342 can also be textured or colored, or may include bitmapped image data. Content of overlay data 342 can be dynamic over time and can be updated by the AP 310, or updated by a mechanism within the DDIC 326. The content can also be dynamic in size and shape.

In one embodiment of the present invention, multiple different sets of overlay data 342 representing multiple overlays can be stored in the overlay buffer 440, e.g., each set having a different color, different image, or different texture. These sets of overlay data 342 may be referred to herein as "pages." In such embodiments, the values in the mask data 500 may also include information to allow the rendering logic 430 to identify the specific page(s) of the overlay data 342 and to only use the identified page(s) during a rendering operation. As such, in some embodiments, the values of mask data 500 contain indices of the pages of the overlay data 342 to allow the rendering logic 430 to switch among the different pages of the overlay data 342 during rendering operations.

In one embodiment of the present invention, the number of values of (or size of) each page of the overlay data 342 equals the number of pixels in one frame of the video images 343 which in turn equals the number of pixels in the combined display image 510. Thus there is a one-to-one relationship between each value of each page of the overlay data 342 and each pixel of the video image 343.

In another embodiment of the present invention, the number of values of (or size of) each page of the overlay data 342 may be less than the number of pixels in a frame of video images 343. Thus, each value of each page of the overlay data 342 may have a one-to-many relationship to the pixels of video images 343 such that a value of each page of the overlay data 342 corresponds to multiple pixels of a video image 343, thereby reducing the size of the overlay data 342 and reducing the memory requirements of the overlay buffer 440. For example, in some embodiments, the overlay data 342 contains a single color value such as an RGB (red green blue) color value, where the entire overlay image (or overlay image segment) 508 is drawn with that single color value. In other embodiments, the different pages of the overlay data 342 are single values corresponding to single colors (e.g., different colors). In still other embodiments, single values may be intermingled with other pages that contain bitmapped images or other values within the overlay data 342.

Figure 6:
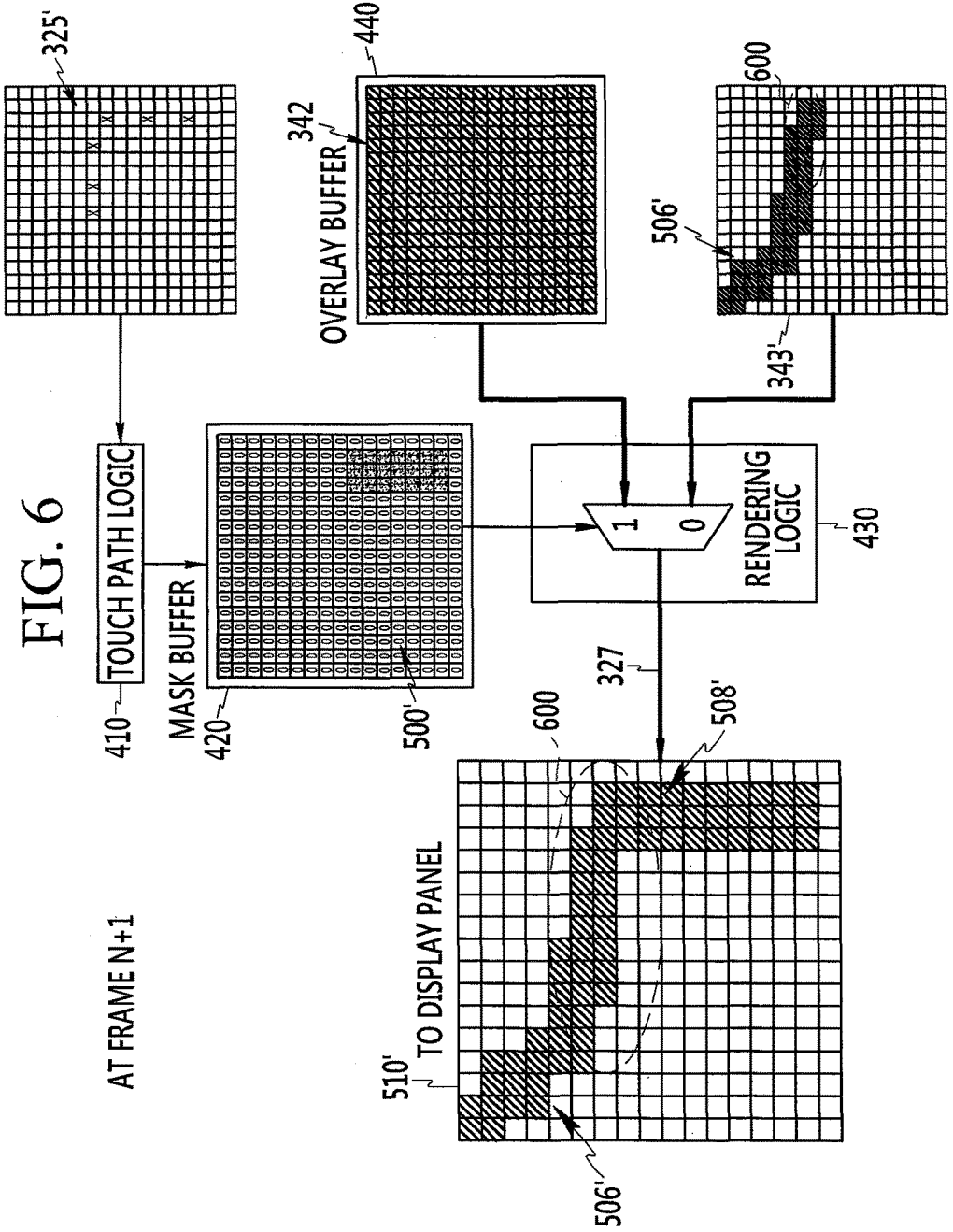

FIG. 6 is a schematic illustration of the combination of video image 343', overlay data 342, and touch events 325' to generate a second set of combined display images 510' during an N+1th frame (e.g., to generate Frame N+1), in accordance with an embodiment of the present invention. In a subsequent frame (e.g., at frame N+1, where N is the frame corresponding to the first set of combined display images 510), the video image 343' from the AP 310 includes image segment 600 that was not displayed in frame N (e.g., not in video image 343 as shown in FIG. 5). In addition, during frame N+1, the touch path logic 410 has calculated, from the touch events 325', a different mask 500' that contains a different set of values from those of the mask 500 shown in FIG. 5. As such, the rendering logic 430 outputs a combined display image 510' that is a composition of the video image 343' from the AP 310 and the overlay data 342 according to the mask data 500'. In one embodiment, the combined display image 510' that contains a line formed by adjoining the image segment 506' (e.g., the software-drawn line) from the AP 310 and the overlay image segment 508' as determined by the mask data 500' and the overlay data 342'.

Figure 7:
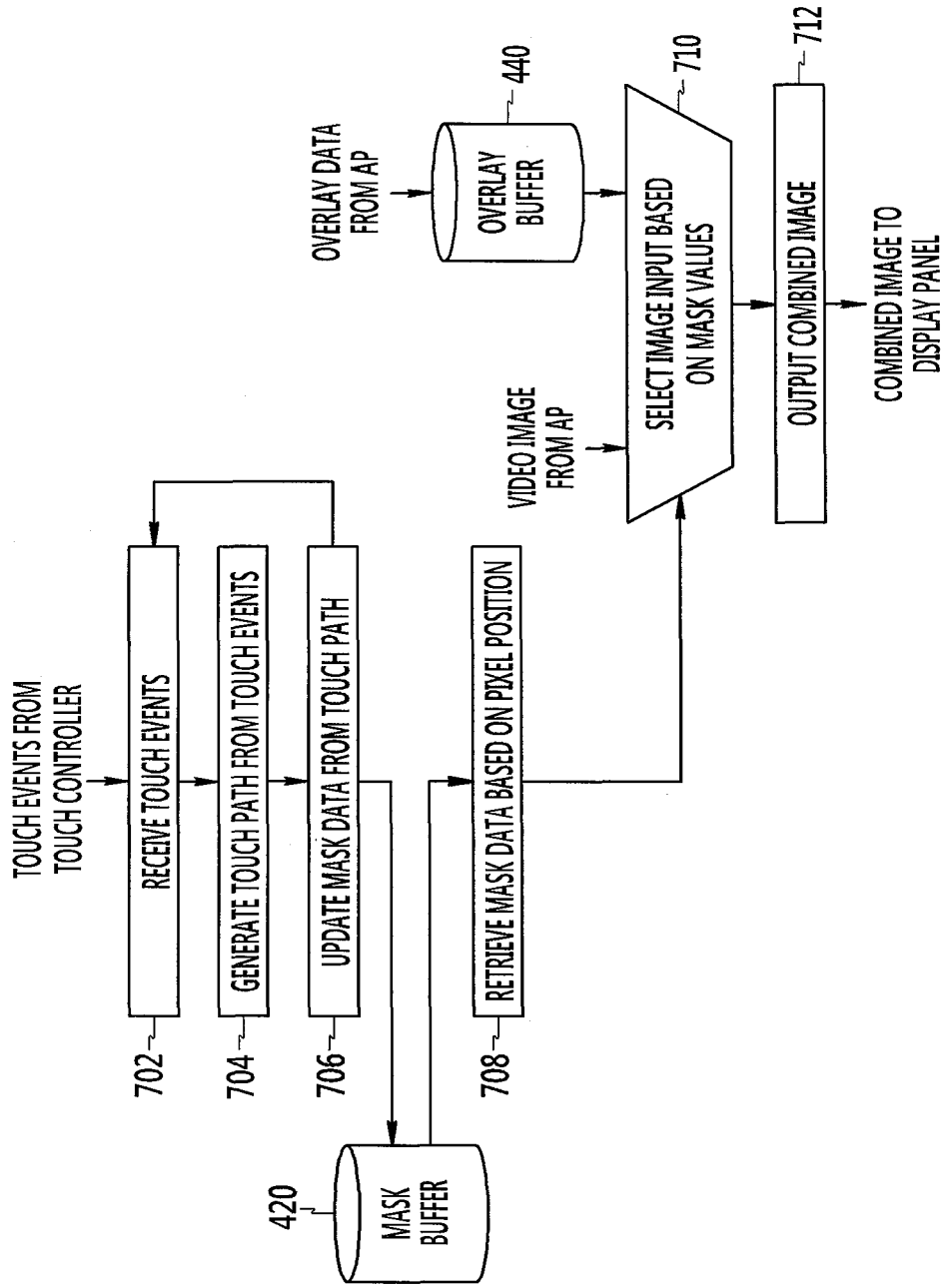
FIG. 7 is a flowchart illustrating a method for reducing display lag in accordance with one embodiment of the present invention.

FIG. 7 is a flowchart illustrating a method for reducing display lag in accordance with an embodiment of the present invention.

Referring to FIG. 7, according to one embodiment of the present invention, in operation 702, touch events are received from an outside source (e.g., a touch sensor panel). A touch path (or estimated touch path) is generated from the touch events in operation 704 by interpolating or extrapolating between the touch events, where the interpolation method may be adjusted by parameters to configure, for example, width, style, straight or curved, region, and color of the overlay image segment 508 of the combined display image.

Mask data 500 is generated from the touch path in operation 706, where the relative positions of the values of the mask data 500 correspond to the relative positions of pixels of the display panel, and where the values of the mask data 500 indicate whether the corresponding pixel of the combined display image should contain either overlay data from the overlay buffer 440 or video image from the AP, or a blended combination thereof. The mask data 500 is stored in the mask buffer 420. In operation 708, the mask data 500 is retrieved from the mask buffer 420, wherein the values retrieved are located at positions within the mask data 500 that correspond to the positions of the pixels currently being processed by the rendering logic 430.

In operation 710, the values of the mask data 500 corresponding to the positions of the currently-being-processed pixels in the display panel are used to selectively output either the overlay data from the overlay buffer 440 or the video image from the AP, or a blend thereof.

In operation 712, the combined display images are output and supplied to the display panel to display the overlay data 342 in a composition with the video image.

As such, embodiments of the present invention provide a system and method for reducing overall system latency by introducing a low-latency loop inside the comparable high-latency loop.

Low-latency display images can be generated by combining information from mask data 500 generated from a touch path, overlay data 342 from the overlay buffer 440, and the high-latency video image from the AP. The touch path is calculated from touch events (e.g., outputs from the touch controller) recorded over time. The overlay data 342 can be provided by the AP or generated in the overlay system.

The overlay characteristics can be dynamically adjusted, including but not limited to color, dimensions (e.g., width), persistence, shading, and timing. These adjustments may be provided by the AP as a set of parameters or may be derived inside the overlay system, for example, by analyzing the video images from the AP). The adjustments can also be determined by touch behavior. For example, the width of the resulting line can be adjusted in accordance with the pressure applied to the touch sensor panel (e.g., the width parameter is proportional to the measured pressure of the touch events).

The display image is generated by the overlay system via the mask data 500, which is calculated from the touch path. The mapping and scaling parameters may be provided by the AP or may be calculated inside the overlay system by, for example, analyzing the touch events or the video images from the AP.

The overlay data can be merged with the video images from the AP at the pixel level by the rendering logic. In one embodiment, pixel characteristics from the video images are substituted with pixel characteristics from the overlay data in accordance with the values of the mask data. In other embodiments, new pixel characteristics are created based on a blend of the respective pixel characteristics from the video images and the overlay data.

While examples in which an overlay system 350 for a first touch screen display device shown in FIG. 3 uses a low-latency loop have been described in FIGS. 4, 5, 6, and 7, an overlay system 360 for a second touch screen display device shown can use the low-latency loop in a same or substantially similar way. Therefore, in the case that a terminal has a plurality of touch sensor panels, the lag which may occur in each touch sensor panel can be reduced or prevented.

On the other hand, an AP 310 may transfer parameters 341 and 344 and overlay data 342 and 345 to DDICs 326 and 336 through at least one independent wire. In some embodiments, the parameters 341 and 344 and the overlay data 342 and 345 may be transferred through at least one display interface wire for transferring video images 343 and 346 from the AP 310 to the DDICs 326 and 336. These embodiments are described with reference to FIGS. 8, 9, 10, and 11.

Figure 8:
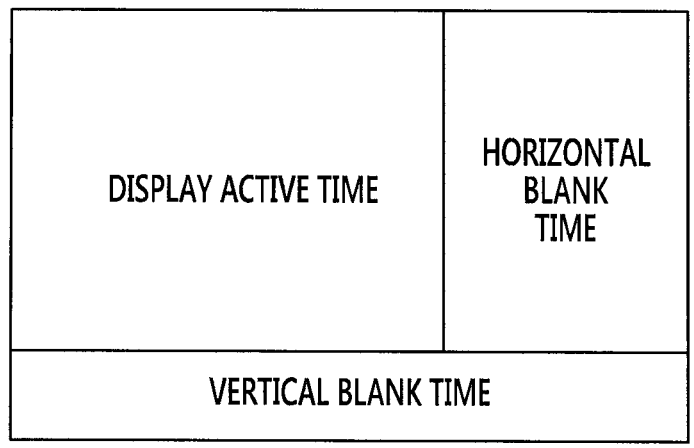
FIG. 8 illustrates one frame time for a video image.
Figure 9:
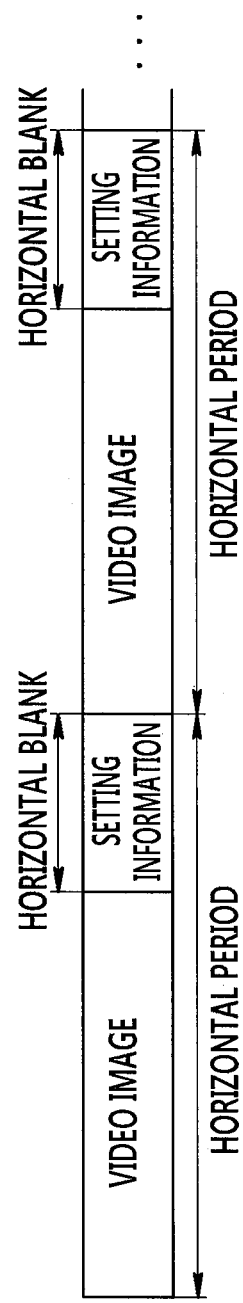
FIG. 9, FIG. 10, and FIG. 11 illustrate providing a parameter and overlay data in accordance with embodiments of the present invention.
Figure 10:
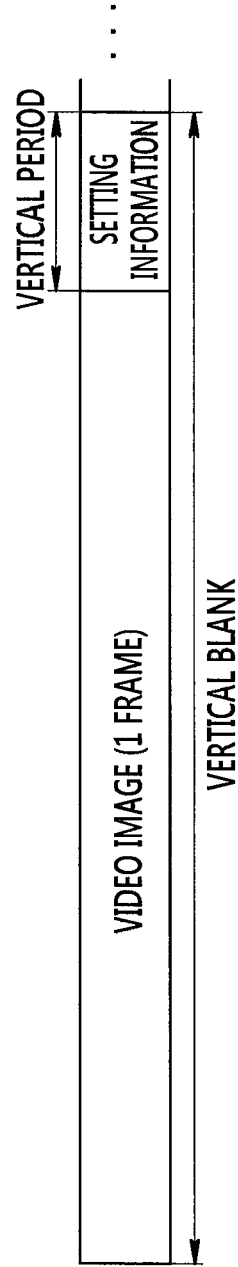
Figure 11:
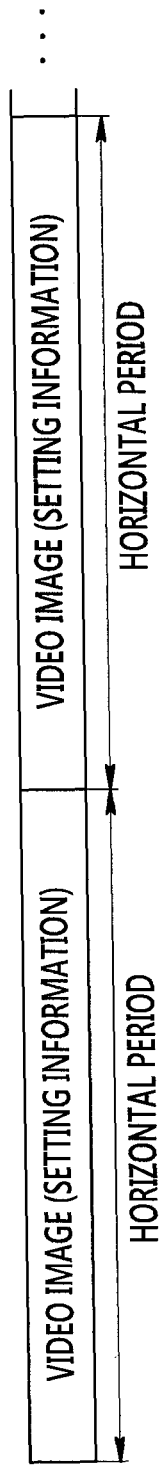

FIG. 8 illustrates one frame time for a video image, and FIGS. 9 10, and 11 illustrate providing a parameter and overlay data in accordance with embodiments of the present invention.

Referring to FIG. 8, on frame time for a video image corresponds to a vertical period, and a plurality of horizontal periods are repeated in the vertical period. Each horizontal period includes a blank time, and the vertical period also includes a blank time. One frame time except for the vertical blank time and the horizontal blank times is called a display active time.

In one embodiment, as shown in FIG. 9, an AP 310 provides DDICs 326 and 336 with overlay setting information including parameters 341 and 344 and/or overlay data 342 and 345 during a horizontal blank time when video image data are not provided.

In another embodiment, as shown in FIG. 10, the AP 310 provides the DDICs 326 and 336 with the overlay setting information including parameters 341 and 344 and/or overlay data 342 and 345, during a vertical blank time when video image data are not provided.

In yet another embodiment, as shown in FIG. 11, the AP 310 provides the DDICs 326 and 336 with the overlay setting information including parameters 341 and 344 and/or overlay data 342 and 345 together with the video image data, during a display active time.

Figure 12:
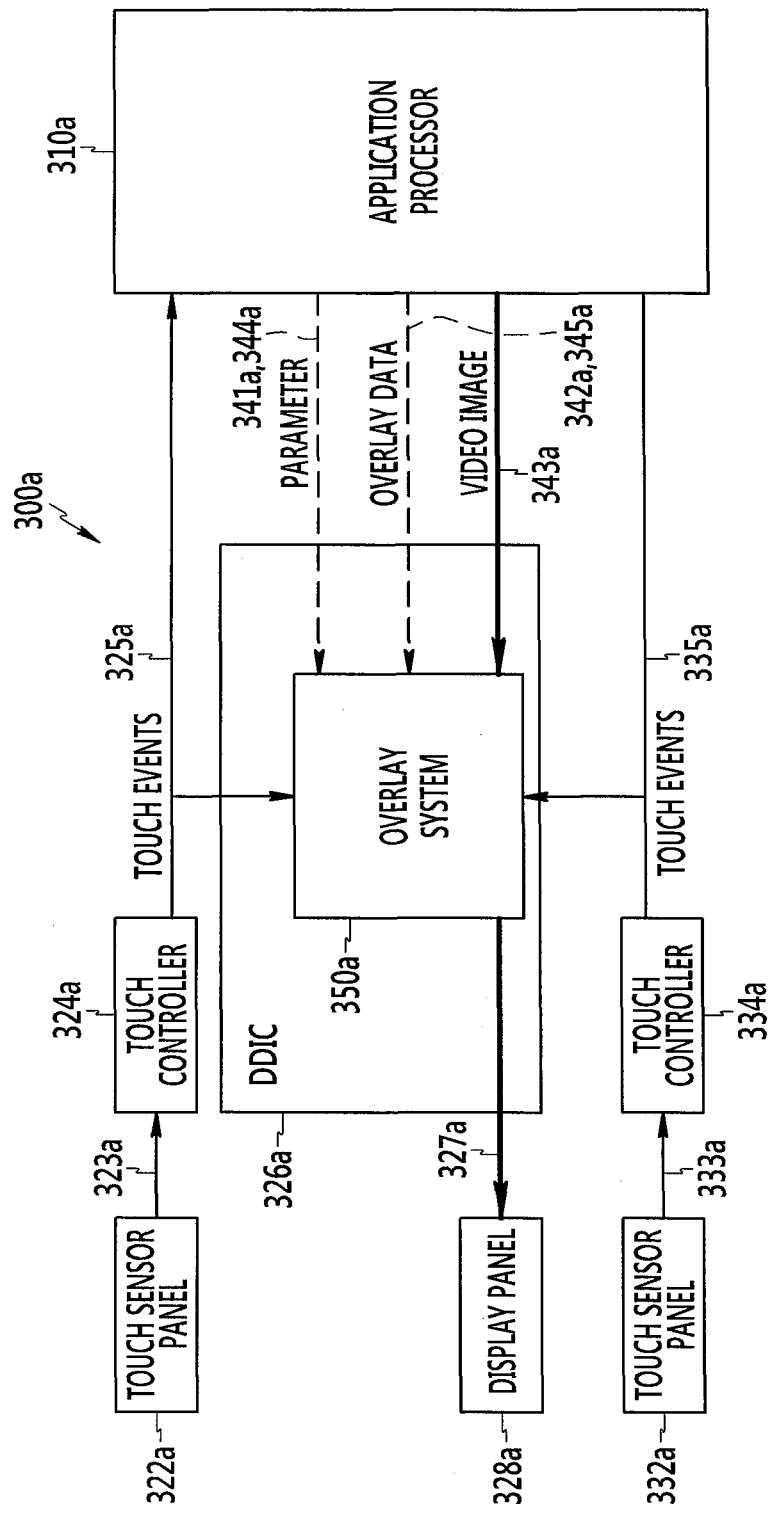
FIG. 12 is a block diagram illustrating a terminal according to another embodiment of the present invention.

In still another embodiment, the AP 310 provides the DDICs 326 and 336 with the overlay setting information including parameters 341 and 344 and/or overlay data 342 and 345 during at least one time of the display active time, the horizontal blank time, and the vertical blank time FIG. 12 is a block diagram illustrating a terminal according to another embodiment of the present invention.

Referring to FIG. 12, in a terminal 300a according to another embodiment of the present invention, a plurality of touch sensor panels, for example two touch sensor panels 322a and 332a are provided in one display panel 328a. In some embodiments, the display panel 328a is a transparent display panel, the first touch sensor panel 322a is provided on a front face of the display panel 328a, and the second touch sensor panel 332a is provided on a rear face of the display panel 328a.

When a touch occurs on the first touch sensor panel 322a, a first touch controller 324a processes touch signals 323a from the first touch sensor panel 322a and outputs touch events 325a, such as coordinates, to an AP 310a and a DDIC 326a. Similarly, when a touch occurs on the second touch sensor panel 322a, a second touch controller 334a processes touch signals 333a from the second touch sensor panel 332a and outputs touch events 335a, such as coordinates, to the AP 310a and the DDIC 326a.

The AP 310a processes the touch events 325a or 335a, and application software running from the AP 310a performs the display composition accordingly, by rendering video images 343a to the DDIC 326a for displaying on the display panel 328a.

The AP 310a is connected to the DDIC 326a, and the DDIC 326a is connected to the display panel 328a. The DDIC 326a receives the video images 343a from the AP 310a and supplies pixel driving signals 327a to the display panel 328a. The DDIC 326a may include an overlay system 350a for the overlay control.

The DDIC 326a may further receive a parameter 341a and overlay data 342a from the AP 310a for the overlay processing according to the touches on the first touch sensor panel 322a. The DDIC 326a may further receive a parameter 344a and overlay data 345a from the AP 310a for the overlay processing according to the touches on the second touch sensor panel 332a.

The terminal 300a combines or blends the overlay data with the video images to generate combined display images in a same or substantially similar way to embodiments described with reference to FIGS. 4, 5, 6, 7, 8, 9, 10, and 11.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for reducing a display lag of a terminal comprising at least one display panel and first and second touch sensor panels corresponding to the at least one display panel, the apparatus comprising:
    at least one overlay buffer configured to store at least one overlay data;
    at least one touch path logic configured to:
        receive first touch events from the first touch sensor panel and generate a first output based on the first touch events,
        receive second touch events from the second touch sensor panel and generate a second output based on the second touch events, and
        generate mask data in accordance with the first touch events or the second touch events; and
    at least one rendering logic configured to, when the first touch events occur:
        receive a first video image;
        receive the first output of the touch path logic; and
        combine the first video image with the overlay data corresponding to the first video image based on the mask data to output at least one combined display image, and to,
    when the second touch events occur:
        receive a second video image;
        receive the second output of the touch path logic; and
        combine the second video image with the overlay data corresponding to the second video image based on the mask data to output the at least one combined display image.

2. The apparatus of claim 1, wherein the first video image or the second video image comprises a line displayed on the display panel, and
    wherein a characteristic of the overlay data matches a characteristic of the line.

3. The apparatus of claim 2, wherein the characteristic comprises a color.

4. The apparatus of claim 1,
wherein the mask data comprises a matrix of numerical values, each of the numerical values identifying an operation of the at least one rendering logic to produce the at least one combined display image, and
wherein positions of the numerical values within the matrix correspond to positions of pixels in the at least one combined display image.

5. The apparatus of-claim 4, wherein the at least one rendering logic is configured to combine the first or second video image with the overlay data by determining, for each pixel in the at least one combined display image, whether to output the first or second video image of a corresponding pixel or the overlay data in accordance with a numerical value in a corresponding position of the mask data.

6. The apparatus of claim 4, wherein the at least one rendering logic is configured to combine the first or second video image with the overlay data by determining, for each pixel in the at least one combined display image, how to blend the first or second video image of a corresponding pixel and the overlay data in accordance with a numerical value in a corresponding position in the mask data.

7. The apparatus of claim 4, wherein the overlay data comprises a plurality of pages, and
wherein the mask data comprises information identifying at least one of the plurality of pages.

8. The apparatus of claim 4, wherein the at least one touch path logic is configured to:
receive a parameter,
compute an estimated touch path in accordance with the first or second touch events, and
generate the mask data in accordance with the estimated touch path and the parameter, and
wherein the parameter controls a region wherein the estimated touch path is allowed, or controls a width, a style, or a shape of the estimated touch path.

9. The apparatus of claim 1, wherein the at least one display panel comprises a first display panel corresponding to the first touch sensor panel and a second display panel corresponding to the second touch sensor panel,
wherein the at least one touch path logic comprises a first touch path logic configured to generate the first output based on the first touch events and a second touch path logic configured to generate the second output based on the second touch events, and
wherein the at least one rendering logic comprises a first rendering logic configured to combine the first video image with the overlay data corresponding to the first video image and a second rendering logic configured to combine the second video image with the overlay data corresponding to the second video image.

10. The apparatus of claim 1, wherein the first touch sensor panel corresponds to a front face of the display panel, and the second touch sensor panel corresponds to a rear face of the display panel.

11. The apparatus of claim 1, wherein the overlay buffer is configured to receive and store the overlay data during a blank time of a horizontal period or a blank time of a vertical period in a frame.

12. The apparatus of claim 1, wherein the overlay buffer is configured to receive and store the overlay data together with the first or second video image in a frame.

13. A terminal comprising:
an application processor;
at least one display panel;
first and second touch sensor panels corresponding to the display panel; and
a processor configured
to receive a video frame for the display panel from the application processor,
to, when first touch events occur on the first touch sensor panel, determine a first touch path based on the first touch events and generate a first mask data in accordance with the first touch path, and to update the video frame based on the first mask data and stored first overlay data, and
to, when second touch events occur on the second touch sensor panel, determine a second touch path based on the second touch events and generate a second mask data in accordance with the second touch path, and to update the video frame based on the second mask data and stored second overlay data.

14. The terminal of claim 13, wherein the video frame comprises a line displayed on the display panel,
wherein a characteristic of the first or second overlay data matches a characteristic of the line.

15. The terminal of claim 13,
wherein the mask data comprises a matrix of numerical values, positions of the numerical values corresponding to positions of pixels in the video frame, and
wherein the processor is configured to update the video frame by determining, for each pixel in the video frame, whether to output a corresponding pixel data of the video frame or the first or second overlay data in accordance with a numerical value in a corresponding position of the mask data.

16. The terminal of claim 13,
wherein the mask data comprises a matrix of numerical values, positions of the numerical values corresponding to positions of pixels in the video frame, and
wherein the processor is configured to update the video frame by determining, for each pixel in the video frame, how to blend a corresponding pixel data of the video frame and the first or second overlay data in accordance with a numerical value in a corresponding position of the mask data.

17. The terminal of claim 13, wherein the processor is configured to receive a parameter from the application processor, and to update the video frame based on the first or second touch path, the first or second overlay data, and the parameter, and
wherein the parameter controls a region wherein the first or second touch path is allowed, or controls a width, a style, or a shape of the first or second touch path.

18. The terminal of claim 13, wherein the display panel comprises a first display panel corresponding to the first touch sensor panel and a second display panel corresponding to the second touch sensor panel, and
wherein the processor comprises a first processor configured to update the video frame based on the first touch path and the first overlay data and a second processor configured to update the video frame based on the second touch path and the second overlay data.

19. The terminal of claim 13, wherein the first touch sensor panel corresponds to a front face of the display panel, and the second touch sensor panel corresponds to a rear face of the display panel.

20. A method of reducing display lag according to a touch input by a terminal, the method comprising:
receiving first touch events from a first touch sensor panel;
receiving a first video image;
generating a first mask data in accordance with the first touch events;

combining the first video image with first overlay data in accordance with the first touch events based on the first mask data;
displaying at least one combined display image of the first video image and the first overlay data;
receiving second touch events from a second touch sensor panel;
receiving a second video image;
generating a second mask data in accordance with the second touch events;
combining the second video image with second overlay data in accordance with the second touch events based on the second mask data; and
displaying the at least one combined display image of the second video image and the second overlay data.

* * * * *